(12) United States Patent
Condamin et al.

(10) Patent No.: US 11,040,639 B2
(45) Date of Patent: Jun. 22, 2021

(54) TRACK ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/399,164

(22) Filed: Apr. 30, 2019

(65) Prior Publication Data
US 2019/0337418 A1 Nov. 7, 2019

Related U.S. Application Data

(63) Continuation-in-part of application No. 16/131,360, filed on Sep. 14, 2018, now Pat. No. 10,759,308, and (Continued)

(30) Foreign Application Priority Data

May 4, 2018 (FR) ...................................... 1853891
May 4, 2018 (FR) ...................................... 1853892

(Continued)

(51) Int. Cl.
*B60N 2/07* (2006.01)
*B60N 2/20* (2006.01)
(Continued)

(52) U.S. Cl.
CPC ......... *B60N 2/0722* (2013.01); *B60N 2/0818* (2013.01); *B60N 2/0843* (2013.01); *B60N 2/20* (2013.01); *B60R 22/22* (2013.01)

(58) Field of Classification Search
CPC ......... B60N 2/0732; B60N 2/502; B60N 2/54
(Continued)

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 9/2013
CN 203799201 U 8/2014
(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Muhammad Ijaz
(74) *Attorney, Agent, or Firm* — Fishman Stewart PLLC

(57) ABSTRACT

A track assembly includes a track and/or a support member. The track may include a first ramped portion and/or a second ramped portion. The support member may include a rolling member. A first side of the rolling member may include a first contact portion, and/or a second side of the rolling member may include a second contact portion. The support member may be configured to move along the track via rotation of the rolling member. The first contact portion and/or the second contact portion may be configured to contact the first ramped portion and/or the second ramped portion. The rolling member may include a flange that may be configured to engage an inner portion of the track. The inner portion may be substantially vertical. The track may include an opening that may be disposed between the inner portion and/or a second inner portion of the track.

20 Claims, 4 Drawing Sheets

Related U.S. Application Data a continuation-in-part of application No. 16/131,614, filed on Sep. 14, 2018, now Pat. No. 10,850,645, and a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, said application No. 16/131,614 is a continuation of application No. 16/131,384, filed on Sep. 14, 2018, now Pat. No. 10,889,208.

(30) Foreign Application Priority Data

May 4, 2018 (FR) ...................................... 1853893
May 4, 2018 (FR) ...................................... 1853894

(51) Int. Cl.
   *B60N 2/08* (2006.01)
   *B60R 22/22* (2006.01)

(58) Field of Classification Search
   USPC ............ 248/560, 429, 298.1, 424, 425, 430;
   16/102
   See application file for complete search history.

(56) References Cited

U.S. PATENT DOCUMENTS

| | | |
|---|---|---|
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A * | 9/1998 | Tsuchiya ............. B60N 2/0715 248/430 |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |

(56) References Cited

U.S. PATENT DOCUMENTS

| | | |
|---|---|---|
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2002/0056798 A1* | 5/2002 | Eguchi ............... B60N 2/01591 248/429 |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1* | 1/2013 | Moriyama ............... B60N 2/01 248/636 |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086230 A1* | 3/2018 | Kume ............... B60N 2/0715 |
| 2018/0086232 A1* | 3/2018 | Kume ............... B60N 2/0707 |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 2005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

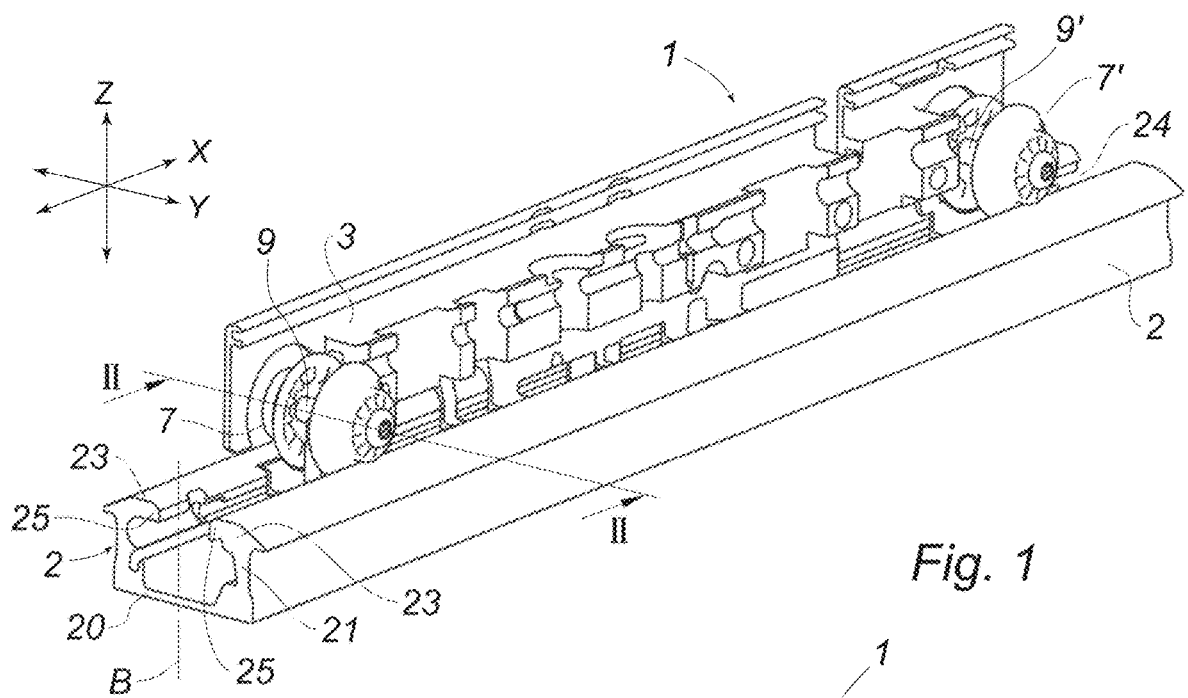
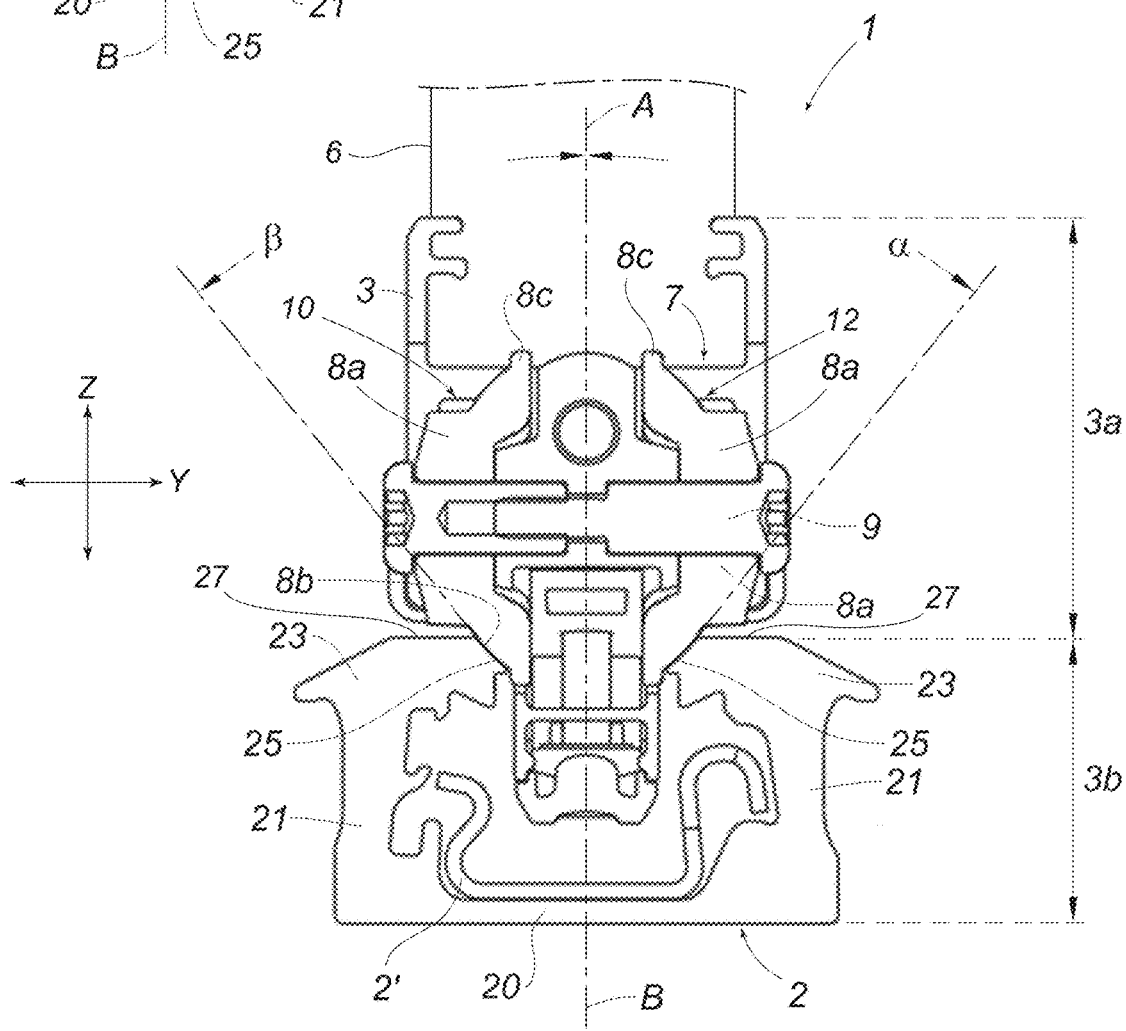

TRACK ASSEMBLY

CROSS-REFERENCE TO RELATED APPLICATIONS

This application is a continuation-in-part of U.S. patent application Ser. No. 16/131,360, filed Sep. 14, 2018, U.S. patent application Ser. No. 16/131,415, filed Sep. 14, 2018, U.S. patent application Ser. No. 16/131,404, filed Sep. 14, 2018, and U.S. patent application Ser. No. 16/131,614, filed Sep. 14, 2018, which is a continuation of U.S. patent application Ser. No. 16/131,384, filed Sep. 14, 2018, the disclosures of which are all hereby incorporated herein by reference in their entireties.

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are all hereby incorporated herein by reference in their entireties.

TECHNICAL FIELD

The present disclosure generally relates to track assemblies, including track assemblies that may include rolling members and/or that may, for example, be used in connection with vehicles and/or seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex to use and/or to assemble. For example, track assemblies may involve a complex process and may include many different steps and components. Some track assemblies may not be configured for centering a support member in the Y-direction along a track.

There is a desire for solutions/options that minimize or eliminate one or more challenges or shortcomings of track assemblies. The foregoing discussion is intended only to illustrate examples of the present field and should not be taken as a disavowal of scope.

SUMMARY

The foregoing and other aspects, features, details, utilities, and/or advantages of embodiments of the present disclosure will be apparent from reading the following description, and from reviewing the accompanying drawings.

In embodiments, A track assembly includes a track and/or a support member. The track may include a first ramped portion and/or a second ramped portion. The support member may include a rolling member. A first side of the rolling member may include a first contact portion, and/or a second side of the rolling member may include a second contact portion. The support member may be configured to move along the track via rotation of the rolling member. The first contact portion and/or the second contact portion may be configured to contact the first ramped portion and/or the second ramped portion. The rolling member may include a flange that may be configured to engage an inner portion of the track. The inner portion may be substantially vertical. The track may include an opening that may be disposed between the inner portion and/or a second inner portion of the track. The flange may be disposed partially in the opening. The first contact portion and/or the second contact portion may be disposed at substantially the same angle as the first ramped portion and/or the second ramped portion. The first contact portion may extend radially from a middle portion of a first wheel portion of the rolling member. The second contact portion may extend radially from a middle portion of a second wheel portion of the rolling member.

With embodiments, the first wheel portion and/or the second wheel portion may include substantially U-shaped cross-sections. The support member may include a motor and/or a gear. The motor may be configured to drive the gear in a first rotational direction and/or a second rotational direction. The gear may be engaged with the rolling member to rotate the rolling member and/or move the support member along the track. The first contact portion and/or the second contact portion may be configured to contact the first ramped portion and/or the second ramped portion to center the support member in a Y-direction along the track. The rolling member may be formed as a monolithic component. The first contact portion may include a convex configuration configured to contact the first ramped portion and maintain contact with the first ramped portion in a plurality of angular positions of the support member.

In embodiments, the track assembly may include a second rolling member. The rolling member may be disposed at or about a first end of the support member, and/or the second rolling member may be disposed at or about a second end of the support member. The first end may be opposite the second end. The support member may include a lever, and/or the lever may be configured to move between a first position and/or a second position. In the first position of the lever, the lever may limit rotation of the rolling member. In the second position, the lever may not substantially limit rotation of the rolling member.

With embodiments, the support member may include a rolling member that may have a first portion, a second portion, and/or a third portion. The support member may include a rod that may rotatably connect the rolling member to the support member. The first portion may be configured to contact the rod. The second portion may be configured to contact the first ramped portion and/or the second ramped portion. The third portion may be configured to contact an inner portion of the track. The first portion may be at least partially aligned with a top portion of the track. The top portion of the track may be substantially horizontal. The inner portion may be substantially vertical. The rod may be substantially V-shaped. The rod may include a first rod portion and/or a second rod portion. The first rod portion and/or the second rod portion may extend at an oblique angle with respect to a transverse direction. The first rod portion may be connected to a first wheel portion of the rolling member, and/or the second rod portion may be connected to a second wheel portion of the rolling member. A rotational axis of a first wheel portion of the rolling member may be substantially parallel to the first ramped portion. A rotational axis of second wheel portion of the rolling member may be substantially parallel to the second ramped portion. The third portion may be disposed at least partially between the inner portion and a second inner portion of the track.

BRIEF DESCRIPTION OF THE DRAWINGS

FIG. 1 is a perspective view of an embodiment of a track assembly according to teachings of the present disclosure.

FIG. 2 is a section view of an embodiment of a track assembly according to teachings of the present disclosure.

DETAILED DESCRIPTION

Figure 3:
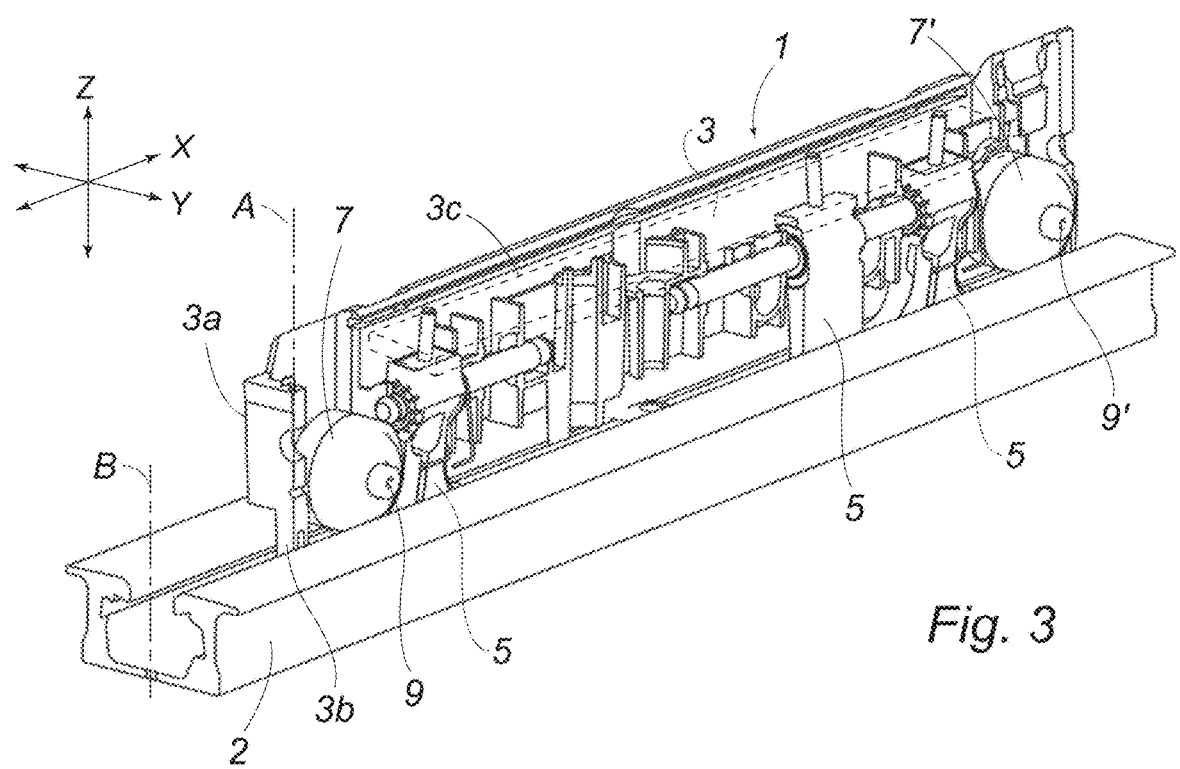
FIG. 3 is a perspective view of an embodiment of a track assembly according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1 and 2, a track assembly 1 may include a first track 2, a second track 2', and/or a support member 3. The support member 3 may be configured to move in the longitudinal direction (the X-direction) along the first track 2 and/or the second track 2'. The first track 2 and/or the second track 2' may extend substantially in the X-direction. The first track 2 and/or the second track 2' may be connected to a mounting surface (e.g., a floor of a vehicle 4). The support member 3 may be connected to a component 6, such as a vehicle seat, console, table, and/or other movable component.

With embodiments, the support member 3 may be selectively connectable to/removable from the first track 2 and/or the second track 2'. The support member 3 may include one or more of a variety of shapes, sizes, and/or configurations. For example and without limitation, the support member 3 may be substantially rectangular. The support member 3 may be configured to move along the tracks 2, 2' in the X-direction (e.g., to adjust the position of the component 6), and/or the support member 3 may be configured to move in the Z-direction relative to the first track 2 and/or the second track 2' (e.g., to remove the support member 3 from the tracks 2, 2'). The support member 3 may include one or more levers 5 that may be configured to selectively connect the support member 3 to the first track 2 and/or the second track 2'. The one or more levers 5 may include a first position and/or a second position. When the one or more levers 5 are in the first position, the one or more levers 5 may not substantially prevent movement of the support member 3 in the X-direction and/or the Z-direction. When the one or more levers 5 are in the second position, the one or more levers 5 may restrict and/or substantially prevent movement of the support member 3 in the X-direction and/or the Z-direction. The support member 3 may include an upper portion 3a and/or a lower portion 3b. The upper portion 3a may not be configured to be disposed in the first track 2. The lower portion 3b may be configured to be disposed in the first track 2 and/or the second track 2'.

In embodiments, such as generally illustrated FIG. 3, the support member 3 may include an actuator 3c (e.g., a slider) that may be configured to move the one or more levers 5 from a first position to a second position. The slider 3c may be connected to a top portion 6a of the support member 3. The slider 3c may be configured to move in the X-direction relative to the support member 3 to move the one or more levers 5 between the first position and the second position. If the lever 5 is in the first position, the lever 5 may limit (e.g., indirectly) rotation of a rolling member 7 of the support member 3. For example and without limitation, in the first position, the lever 5 may engage the second track 2' to limit movement of the support member 3 relative to the tracks 2, 2', which may limit movement of the rolling member 7. If the lever 5 is in the second position, the lever 5 may not substantially limit rotation of a rolling member 7 of the support member 3.

With embodiments, such as generally illustrated in FIGS. 2, 3, 4, and 5, the support member 3 may include one or more rolling members 7, 7' (e.g., wheels) that may be configured to move the support member 3 along the first track 2 and/or the second track 2'. The rolling members 7, 7' may be configured to guide the support member 3 along the first track 2 and/or the rolling members 7, 7' may assist in connecting the support member 3 to the track in the Z-direction. The rolling members 7, 7' may be formed as a single/monolithic/unitary component (see, e.g., FIGS. 3 and 5) and/or the rolling members 7, 7' may be formed of multiple components, such as wheel portions 10, 12 (see, e.g., FIGS. 2 and 6). The support member 3 may include one or more rolling members 7. For example and without limitation, the support member 3 may include a first rolling member 7 that may be disposed at or about a first longitudinal end of the support member 3, and/or the support member 3 may include a second rolling member 7' that may be disposed at or about a second longitudinal end of the support member 5. The first rolling member 7 and/or the second rolling member 7' may be rotatably connected to the support member 3 via a first rod 9 and/or a second rod 9', respectively. The first rod 9 and/or the second rod 9' may be fixed to the support member 3 such that the first rolling member 7 and/or the second rolling member 7' may rotate about the first rod 9 and/or the second rod 9', respectively. The rolling members 7, 7' and/or the rods 9, 9' may be substantially disposed in the support member 3. For example and without limitation, the rolling members 7, 7' may not project in the Y-direction from the outer sides of the support member 3.

In embodiments, the rolling members 7, 7' (e.g., the wheel portions 8) may include a first portion 8a, a second portion 8b, and/or a third portion 8c. The first portion 8a may be a center portion of the rolling member 7. The first portion 8a may be in contact with the first rod 9 such that the first portion 8a may facilitate rotation of the rolling member 7 about the first rod 9. The first portion 8a may be substantially circular and/or rounded. As the rolling members 7, 7' rotate about or with the rods 9, 9', the support member 3 may move in the X-direction along the first track 2 and/or the second portion 8b may contact the ramped portion 25 (e.g., the second portions 8b may be configured as first and second contact portions of the rolling members 7, 7'). The second portion 8b may include one or more shapes, sizes, and/or configurations. For example and without limitation, the second portion 8b may be substantially ramped, conical, convex, curved, and/or toric. A convex, curved, and/or toric configuration of the second portion 8b may help maintain contact between the second portion 8b and the track 2 (e.g., the ramped portion 25), such as if the track assembly 1 is used in connection with a second track assembly 1 that is offset (e.g., vertically) from the track assembly 1 and/or if the support member and/or the component 6 is disposed at angle relative to the track 2 (e.g., an oblique angle relative to plane A). For example and without limitation, a convex second portion 8*b* may be configured maintain contact with a ramped portion 25 in a plurality of angular positions of the support member 3. The second portion 8*b* may not be substantially parallel to the first rod 9 and/or the second rod 9'. The second portion 8*b* may form an acute angle with respect a vertical plane of symmetry A of the support member 3. The second portion 8*b* may extend radially from the first portion 8*a*. The third portion 8*c* of the rolling member 7 may be configured to be at least partially disposed in the first track 2. The third portion 8*c* may include a radius larger than the second portion 8*b*. The third portion 8*c* may extend radially outward relative to an axis of the first rod 9 and/or the second rod 9'. The third portions 8*c* may be configured as flanges that may be configured to engage inner portions 26 of the first track 2. The third portions 8*c* may be disposed axially inward of the first portions 8*a* and/or the second portions 8*b*, and/or may be disposed at or about the middle of the rolling members 7, 7'. The inner portions 26 may be disposed at inner ends of the ramped portions 25, may be substantially planar, and/or may be substantially vertical. The opening 24 may be disposed between the inner portions 26. The third portions 8*c* of the rolling member 7, 7' may be disposed at least partially in the opening 24 and/or at least partially between the inner portions 26 of the first track 2. The first portion 8*a*, the second portion 8*b*, and/or the third portion 8*c* may be configured such that the rolling members 7, 7' may include a substantially U-shaped and/or V-shaped cross-sectional shape.

Figure 4:
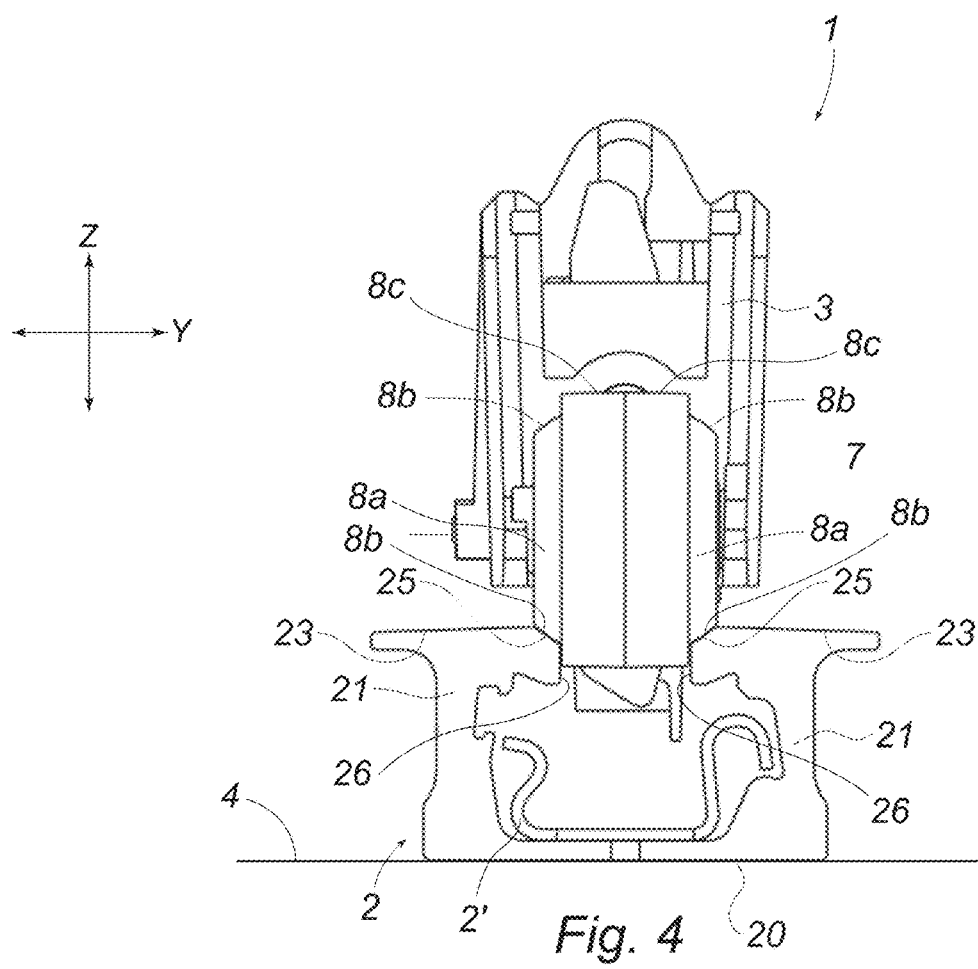
FIG. 4 is a section view of an embodiment of a track assembly according to teachings of the present disclosure.
Figure 5:
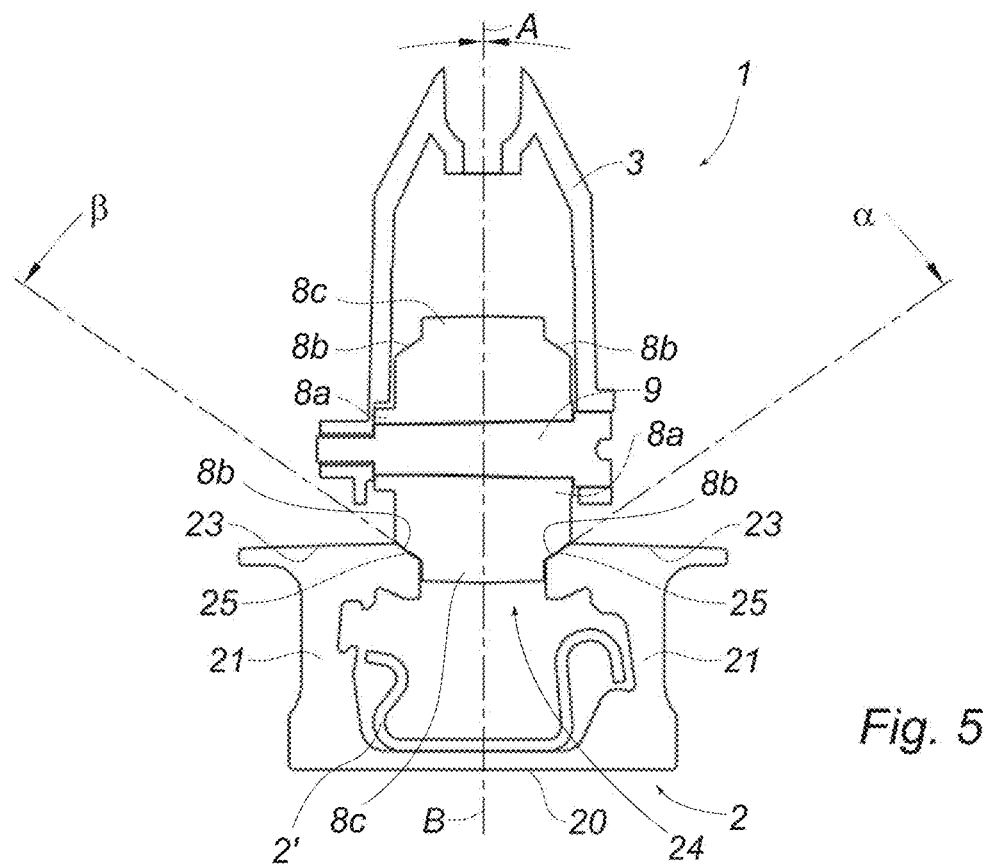
FIG. 5 is a section view of an embodiment of a track assembly according to teachings of the present disclosure.

With embodiments, such as generally illustrated in FIGS. 2, 4, and 5, the track assembly 1 may include a first track 2 and/or a second track 2'. The first track 2 and/or the second track 2' may include one or more of a variety of materials. For example and without limitation, the first track 2 may include a first material (e.g., aluminum) and/or the second track 2' may include a second material (e.g., steel). The second material may be heavier, denser, and/or stronger than the first material. The second track 2' may be disposed substantially in the first track 2. The first track 2 may include a bottom wall 20, two side walls 21, two upper wings 23, and/or an opening 24. The two side walls 21 may extend in the Z-direction from the bottom wall 20. The upper wings 23 may extend in the Y-direction from the side walls 21.

In embodiments, an opening 24 may be defined between the upper wings 23 (e.g., between inner portions 26), and/or the opening 24 may be configured to receive the bottom portion 3*b* of the support member 3. The upper wings 23 may each include a ramped portion 25. The ramped portions 25 may form an acute angle α, β with a substantially vertical plane A. The ramped portion 25 may include an angle that may be substantially the same as an angle of the second portions 8*b* of the rolling members 7, 7', such that the ramped portions 25 may contact the second portions 8*b* (e.g., the rolling members 7, 7' may roll along the ramped portions 25 as the support member 3 moves in the X-direction).

With embodiments, the support member 3 may include a center plane A, and/or the first track 2 may include a center plane B. The support member 3 may be connected to the first track 2 such that the support member center plane A is substantially aligned (in the Y-direction) with the first track center plane B. The ramped portions 25 and the second portions 8*b* of the rolling members 7, 7' may center the support member 3 about the first track 2. The ramped portions 25 and/or the second portions 8*b* of the rolling members 7, 7' may substantially limit movement of the support member 3 in the Y-direction when the support member 3 may be in contact with the first track 2 and/or the second track 2'. The third portions 8*c* of the rolling members 7, 7' may substantially limit movement of the support member 3 in the Y-direction when the support member 3 may be engaged with the first track 2 and/or the second track 2'.

In embodiments, the second portions 8*b* and/or the third portions 8*c* of the rolling members 7, 7' may provide a degree of play for the support member 3 when connected to the first track 2. For example and without limitation, due to the substantially same angles of the ramped portion 25 and the second portions 8*b* of the rolling members 7, 7', the rolling member 7, 7' may substantially center the support member 3 (e.g., in the Y-direction) along the first track 2 even if the track assembly 1 include gaps, manufacturing dispersions, and/or defects.

Figure 6:
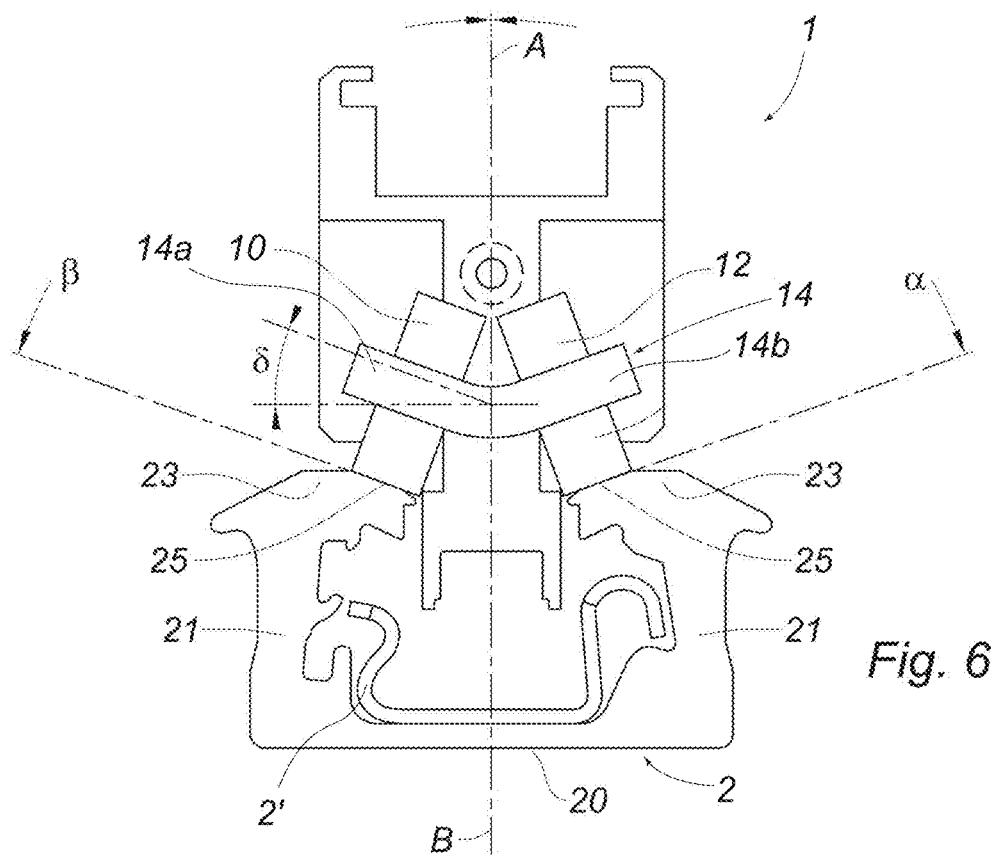
FIG. 6 is a section view of an embodiment of a track assembly according to teachings of the present disclosure.

In embodiments, such as generally illustrated in FIG. 6, the rolling member 7 may include an axis of rotation that may not be parallel to the Y-direction. For example and without limitation, the rotational axis of the rolling member 7 may be disposed at an angle δ between about 10° and about 80°. The ramped portions 25 may be disposed at the same angle α, β as the axis of rotation of the rolling member 7, 7'. Each rolling member 7, 7' may include two axes of rotation. For example and without limitation, each rolling member 7, 7' may include a first wheel portion 10 and/or a second wheel portion 12. The first wheel portion 10 and/or the second wheel portion 12 may include a rotational axis substantially parallel to the angle δ of the ramped portions 25. The first wheel portion 10 and/or the second wheel portion 12 may be connected to a single rod 14. The rod 14 may be substantially V-shaped, and/or may not be parallel to the first track 2 and/or the second track 2'. The rod 14 may include a first bent portion 14*a* and/or a second bent portion 14*b*. The first bent portion 14*a* and/or the second portion 14*b* may be substantially parallel to the ramped portions 25 and/or the rotational axis of the first wheel portion 10 and/or the second wheel portion 12. The first bent portion 14*a* and/or the second bent portion 14*b* may be disposed at an angle δ to the Y-direction.

With embodiments, contact between the ramped portions 25 and the second portions 8*b* of the rolling member 7 may bias the support member 3 in a first direction and a second direction. The first direction and the second direction may be substantially aligned with the Y-direction and/or the first direction may be opposite the second direction. The first direction and/or the second direction may center the support member 3 (e.g., in the Y-direction) along the first track 2 and/or the second track 2'.

Figure 7:
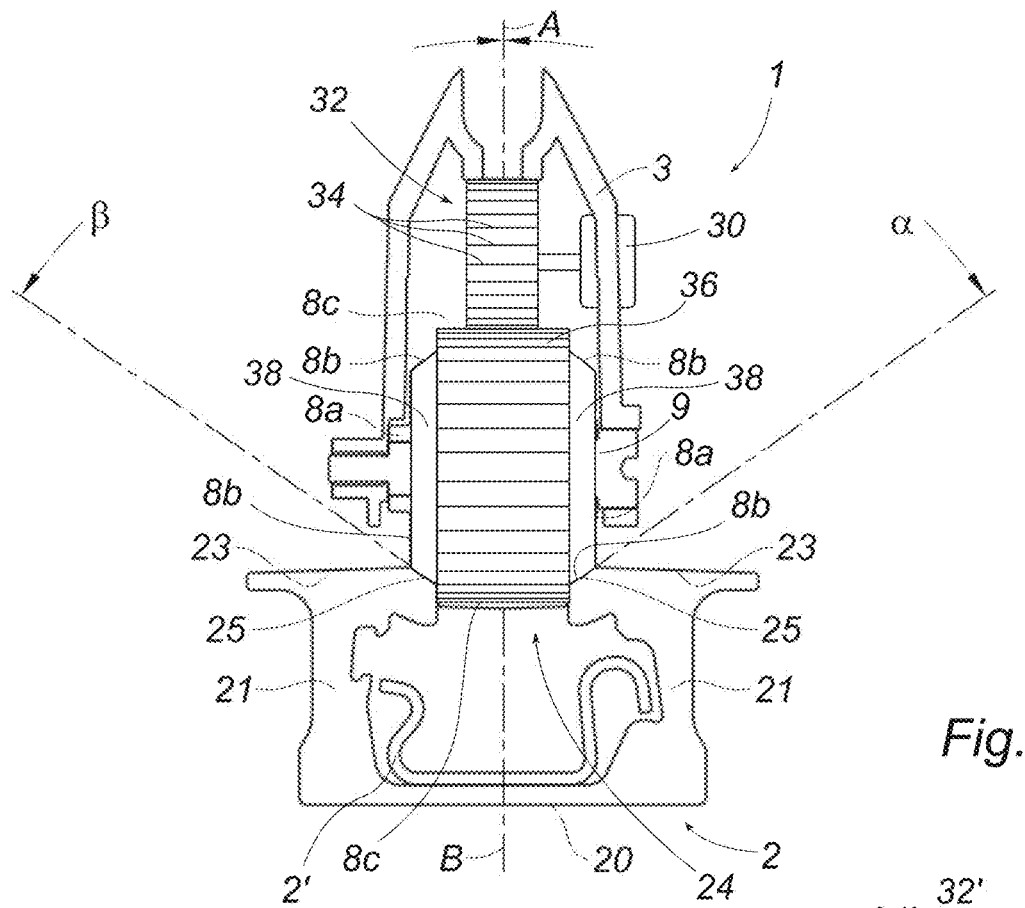
FIG. 7 is a section view of an embodiment of a track assembly according to teachings of the present disclosure.
Figure 8:
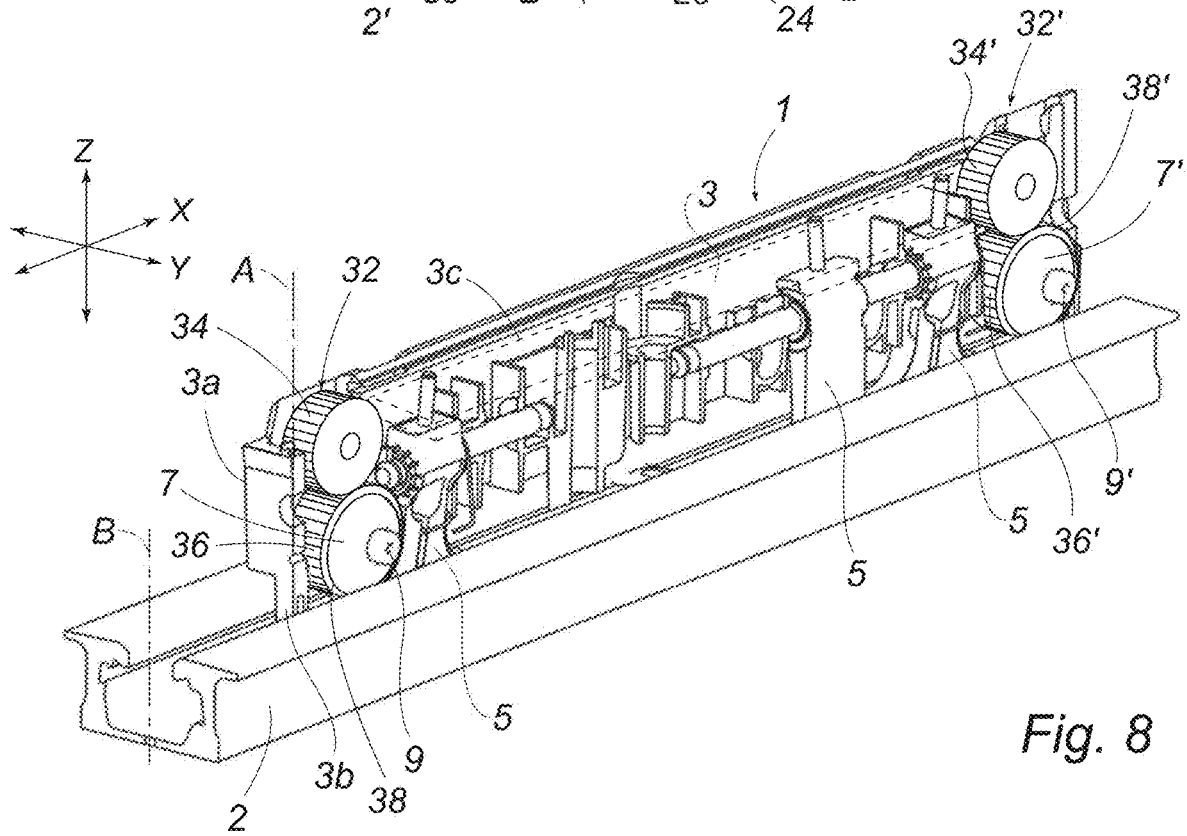
FIG. 8 is a perspective view of an embodiment of a track assembly according to teachings of the present disclosure.

In embodiments, such as generally illustrated in FIGS. 7 and 8, the support member 3 may include a motor 30 and/or a gear 32. The motor 30 and/or the gear 32 may be disposed substantially in the support member 3; and/or the motor 30 and/or the gear 32 may be disposed above the rolling member 7 (e.g., in the Z-direction). The support member 3 may be configured to move along the first track 2 via a motor 30 and/or a gear 32. The motor 30 may be connected to a gear 32 such that rotation of the gear 32 may cause the rolling member 7 to rotate. The motor 30 may rotate/drive the gear 32 in a first rotational direction which may rotate the rolling member 7 in a second rotational direction. As the rolling member 7 rotates in the second rotational direction, the support member 3 may move in a first direction (e.g., forward in the X-direction) along the first track 2. The motor 30 may rotate the gear 32 in the second rotational direction which may rotate the rolling member 7 in the first rotational direction. As the rolling member 7 rotates in the first rotational direction, the support member 3 may move in a second direction (e.g., rearward in the X-direction) along the first track 2. The first direction may be opposite the second direction.

With embodiments, the gear 32 may include one or more gear teeth 34, and/or the rolling member 7 may include one or more rolling member teeth 36. The gear teeth 34 may be disposed about an outer surface of the gear 32 and/or the gear teeth 34 may be disposed along a circumference of the gear 32. The gear teeth 34 may be configured to at least partially engage the rolling member teeth 36. The rolling member teeth 36 may be disposed circumferentially about the rolling member 7. The rolling member teeth 36 may be disposed on the third portion 8c of the rolling member 7. As the gear 32 rotates, the gear teeth 34 may contact the rolling member teeth 36 which may rotate the rolling member 7. The rolling member 7 may include a friction element 38. The friction element 38 may include one or more of a variety of materials that may be configured to increase friction between the rolling member 7 and the track 2. For example and without limitation, the friction element 38 include a rubber material. The friction element 38 may include one or more of a variety of shapes, sizes, and/or configurations. For example and without limitation, the friction element 38 may be a ring and/or a protrusion disposed on an outer surface of the rolling member. The friction element 38 may be configured to contact the first track 2 (e.g., the ramped portions 25 of the first track 2). Contact between the friction element 38 and the first track 2 may increase friction such as to improve the connection between the rolling member 7 and the first track 2. The friction element 38 may be disposed on the second portion 8b of the rolling member 7. The friction element 38 may facilitate traction between the rolling member 7 and the first track 2 to efficiently move the support member 3 along the first track 2. The track assembly 1 may include a second motor 30' and/or a second gear 32'. The second gear 32' may include one or more second teeth 36', and/or one or more second friction elements 38'. The second gear 32' may be configured to contact and/or drive the second rolling member 7'. The second motor 30' and/or second gear 32' may be configured substantially the same as the motor 30 and/or the gear 32.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly, comprising:
   a track, including:
      a bottom wall;
      a first side wall;
      a second side wall;
      a first upper wing extending from the first side wall and having a first ramped portion; and
      a second upper wing extending from the second side wall and having a second ramped portion; and
   a support member including a rolling member;
   wherein a first side of the rolling member includes a first contact portion;
   a second side of the rolling member includes a second contact portion;
   the support member is configured to move along and relative to the track in a longitudinal direction via rotation of the rolling member;

the first contact portion is configured to contact the first ramped portion;

the second contact portion is configured to contact the second ramped portion; and the first ramped portion and the second ramped portion are ramped relative to a transverse direction of the track.

2. The track assembly of claim 1, wherein the rolling member includes a flange configured to engage an inner portion of the track.

3. The track assembly of claim 2, wherein the inner portion is substantially vertical relative to the longitudinal direction of the track;

the flange is disposed axially inward of the first contact portion and the second contact portion; and the flange extends radially outward beyond the first contact portion and the second contact portion.

4. The track assembly of claim 2, wherein the track includes an opening disposed between the inner portion and a second inner portion of the track, and the flange is disposed partially in the opening.

5. The track assembly of claim 1, wherein the first contact portion and the second contact portion are disposed at substantially a same angle as the first ramped portion and the second ramped portion.

6. The track assembly of claim 5, wherein the first contact portion extends radially from a middle portion of a first wheel portion of the rolling member, and the second contact portion extends radially from a middle portion of a second wheel portion of the rolling member.

7. The track assembly of claim 6, wherein the first wheel portion and the second wheel portion have substantially U-shaped cross-sections.

8. The track assembly of claim 1, wherein the first contact portion and the second contact portion are configured to contact the first ramped portion and the second ramped portion to center the support member in the transverse direction between the first and second ramped portions; and the support member is connected to and supports one or more vehicle components.

9. The track assembly of claim 1, wherein the first contact portion includes a convex configuration configured to contact the first ramped portion and maintain contact with the first ramped portion in a plurality of angular positions of the support member.

10. The track assembly, of claim 1, including a second rolling member; the rolling member is disposed at or about a first end of the support member; the second rolling member is disposed at or proximate a second end of the support member; and the first end is opposite the second end.

11. The track assembly of claim 1, wherein the support member includes a lever; the lever is configured to move between a first position and a second position; in the first position of the lever, the lever limits movement of the support member relative to the track; and in the second position, the lever does not substantially limit movement of the support member relative to the track.

12. A track assembly, comprising:
a track, including:
a first ramped portion; and
a second ramped portion; and
a support member including a rolling member;

wherein a first side of the rolling member includes a first contact portion; a second side of the rolling member includes a second contact portion; the support member is configured to move along the track via rotation of the rolling member; the first contact portion is configured to contact the first ramped portion; and the second contact portion is configured to contact the second ramped portion; and wherein the support member includes a motor and a gear; the motor is configured to drive the gear in a first rotational direction and a second rotational direction; and the gear is engaged with the rolling member to rotate the rolling member and move the support member along the track.

13. A track assembly, comprising:
a track including a first upper wing having a first ramped portion and a second upper wing having a second ramped portion; and
a support member configured to move along and relative to the track, the support member including:
a rolling member having a first portion, a second portion, and a third portion; and
a rod rotatably connecting the rolling member to the support member;
wherein the first portion is configured to contact the rod, the second portion is configured to contact the first ramped portion or the second ramped portion; and the third portion is configured to contact an inner portion of the track.

14. The track assembly of claim 13, wherein the first portion is at least partially aligned with a vertical level of a top portion of the track; and
the top portion of the track is substantially horizontal.

15. The track assembly of claim 13, wherein the inner portion is substantially vertical relative to a longitudinal direction of the track.

16. The track assembly of claim 13, wherein the rod is substantially V-shaped.

17. The track assembly of claim 13, wherein the rod includes a first rod portion and a second rod portion; and the first rod portion and the second rod portion extend at an oblique angle with respect to a transverse direction.

18. The track assembly of claim 17, wherein the first rod portion is connected to a first wheel portion of the rolling member; and
the second rod portion is connected to a second wheel portion of the rolling member.

19. The track assembly of claim 13, wherein a rotational axis of a first wheel portion of the rolling member is substantially parallel to the first ramped portion;
a rotational axis of a second wheel portion of the rolling member is substantially parallel to the second ramped portion; and
the first ramped portion is ramped relative to a transverse direction of the track.

20. The track assembly of claim 13, wherein the third portion is disposed at least partially between the inner portion and a second inner portion of the track and
the inner portion and the second inner portion are substantially perpendicular to a transverse direction of the track.

* * * * *